United States Patent
Havemose

(10) Patent No.: US 9,164,843 B1
(45) Date of Patent: Oct. 20, 2015

(54) SYSTEM AND METHOD FOR HYBRID KERNEL AND USER-SPACE CHECKPOINTING USING A CHARACTER DEVICE

(71) Applicant: Open Invention Network LLC, Durham, NC (US)

(72) Inventor: Allan Havemose, Arroyo Grande, CA (US)

(73) Assignee: Open Invention Network, LLC, Durham, NC (US)

( * ) Notice: Subject to any disclaimer, the term of this patent is extended or adjusted under 35 U.S.C. 154(b) by 197 days.

(21) Appl. No.: 13/920,889

(22) Filed: Jun. 18, 2013

Related U.S. Application Data

(63) Continuation of application No. 13/096,461, filed on Apr. 28, 2011, now Pat. No. 8,745,442.

(51) Int. Cl.
*G06F 11/00* (2006.01)
*G06F 11/14* (2006.01)

(52) U.S. Cl.
CPC ........ *G06F 11/1407* (2013.01); *G06F 11/1446* (2013.01); *G06F 11/1471* (2013.01)

(58) Field of Classification Search
CPC .......................... G06F 11/1407; G06F 11/1471
USPC ...................................................... 714/13, 15
See application file for complete search history.

(56) References Cited

U.S. PATENT DOCUMENTS

| | | | | |
|---|---|---|---|---|
| 4,823,261 A * | 4/1989 | Bank et al. | 711/152 |
| 4,912,707 A * | 3/1990 | Kogge et al. | 714/17 |
| 5,774,660 A * | 6/1998 | Brendel et al. | 709/201 |
| 5,951,650 A * | 9/1999 | Bell et al. | 709/238 |
| 5,996,016 A * | 11/1999 | Thalheimer et al. | 709/227 |
| 6,021,408 A * | 2/2000 | Ledain et al. | 707/823 |
| 6,154,877 A * | 11/2000 | Ramkumar et al. | 717/114 |
| 6,161,219 A * | 12/2000 | Ramkumar et al. | 717/130 |
| 6,484,276 B1 * | 11/2002 | Singh et al. | 714/41 |
| 6,496,979 B1 * | 12/2002 | Chen et al. | 717/178 |
| 6,691,245 B1 * | 2/2004 | DeKoning | 714/6.31 |
| 6,718,538 B1 * | 4/2004 | Mathiske | 717/129 |
| 6,766,471 B2 * | 7/2004 | Meth | 714/16 |
| 6,823,474 B2 * | 11/2004 | Kampe et al. | 714/13 |
| 6,854,069 B2 * | 2/2005 | Kampe et al. | 714/4.12 |
| 7,020,599 B1 * | 3/2006 | Cao et al. | 703/22 |
| 7,028,305 B2 * | 4/2006 | Schaefer | 719/310 |
| 7,096,388 B2 * | 8/2006 | Singh et al. | 714/38.12 |
| 7,243,262 B2 * | 7/2007 | Mukherjee et al. | 714/15 |
| 7,293,200 B2 * | 11/2007 | Neary et al. | 714/35 |
| 7,519,963 B1 * | 4/2009 | Blaser et al. | 717/174 |

(Continued)

*Primary Examiner* — Joshua P Lottich
(74) *Attorney, Agent, or Firm* — Haynes and Boone, LLP

(57) ABSTRACT

A system, method, and computer readable medium for hybrid kernel-mode and user-mode checkpointing of multi-process applications. The computer readable medium includes computer-executable instructions for execution by a processing system. A multi-process application runs on primary hosts and is checkpointed by a checkpointer comprised of a kernel-mode checkpointer module and one or more user-space interceptors providing barrier synchronization, checkpointing thread, resource flushing, and an application virtualization space. Checkpoints may be written to storage and the application restored from said stored checkpoint at a later time. Checkpointing is transparent to the application and requires no modification to the application, operating system, networking stack or libraries. In an alternate embodiment the kernel-mode checkpointer is built into the kernel.

16 Claims, 10 Drawing Sheets

(56) References Cited

U.S. PATENT DOCUMENTS

| | | | |
|---|---|---|---|
| 7,657,787 B2* | 2/2010 | Turner et al. | 714/15 |
| 7,673,308 B2* | 3/2010 | McMillan et al. | 719/331 |
| 8,082,468 B1* | 12/2011 | Backensto et al. | 714/15 |
| 8,127,174 B1* | 2/2012 | Shah et al. | 714/13 |
| 8,352,933 B2* | 1/2013 | Amann et al. | 717/170 |
| 8,458,696 B2* | 6/2013 | Park et al. | 718/1 |
| 8,549,532 B2* | 10/2013 | Ganesh | 718/105 |
| 2002/0007468 A1* | 1/2002 | Kampe et al. | 714/4 |
| 2002/0032883 A1* | 3/2002 | Kampe et al. | 714/16 |
| 2002/0124089 A1* | 9/2002 | Aiken et al. | 709/227 |
| 2002/0169884 A1* | 11/2002 | Jean et al. | 709/230 |
| 2003/0028635 A1* | 2/2003 | DeMent et al. | 709/225 |
| 2003/0069993 A1* | 4/2003 | Na et al. | 709/245 |
| 2004/0210895 A1* | 10/2004 | Esfahany | 717/174 |
| 2004/0268175 A1* | 12/2004 | Koch et al. | 714/4 |
| 2005/0050304 A1* | 3/2005 | Mukherjee et al. | 712/218 |
| 2005/0251785 A1* | 11/2005 | Vertes et al. | 717/105 |
| 2005/0257090 A1* | 11/2005 | Santos et al. | 714/35 |
| 2006/0075381 A1* | 4/2006 | Laborczfalvi et al. | 717/100 |
| 2006/0085679 A1* | 4/2006 | Neary et al. | 714/13 |
| 2006/0090097 A1* | 4/2006 | Ngan et al. | 714/6 |
| 2007/0260920 A1* | 11/2007 | Turner et al. | 714/17 |
| 2007/0277056 A1* | 11/2007 | Varadarajan et al. | 714/15 |
| 2008/0077934 A1* | 3/2008 | Browning et al. | 718/107 |
| 2008/0141255 A1* | 6/2008 | Browning et al. | 718/102 |
| 2008/0183990 A1* | 7/2008 | Chen | 711/162 |
| 2008/0301101 A1* | 12/2008 | Baratto et al. | 707/3 |
| 2009/0271787 A1* | 10/2009 | Clark | 718/1 |
| 2010/0107158 A1* | 4/2010 | Chen et al. | 718/1 |
| 2010/0153674 A1* | 6/2010 | Park et al. | 711/165 |
| 2010/0205604 A1* | 8/2010 | Brower et al. | 718/102 |
| 2011/0246617 A1* | 10/2011 | Sheehan et al. | 709/219 |

* cited by examiner

FIG.1 – Core Architecture

FIG.2 – Primary and Backup Pair

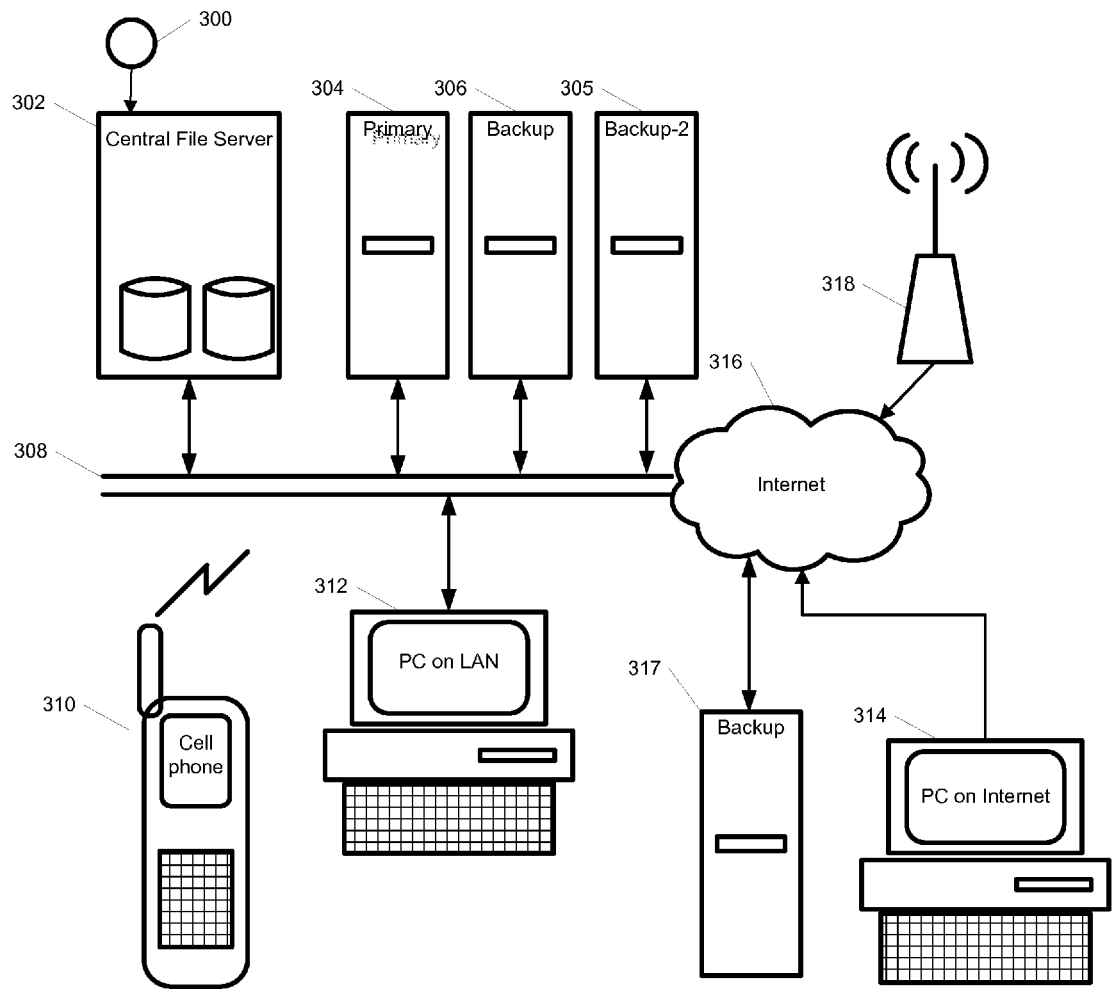
Fig.10 – Deployment scenarios

SYSTEM AND METHOD FOR HYBRID KERNEL AND USER-SPACE CHECKPOINTING USING A CHARACTER DEVICE

CROSS-REFERENCE TO RELATED APPLICATIONS

The present application is a continuation of and claims priority from U.S. patent application Ser. No. 13/096,461 filed Apr. 28, 2011 titled SYSTEM AND METHOD FOR HYBRID KERNEL- AND USER-SPACE CHECKPOINTING, and is related to U.S. patent application Ser. No. 12/334,660, filed Dec. 15, 2008, titled METHOD AND SYSTEM FOR PROVIDING CHECKPOINTING TO WINDOWS APPLICATION GROUPS, the disclosure of which are hereby incorporated by reference herein in their entirety. The present invention is also related to U.S. patent application Ser. No. 12/334,634 filed Dec. 15, 2008 titled METHOD AND SYSTEM FOR PROVIDING COORDINATED CHECKPOINTING TO A GROUP OF INDEPENDENT COMPUTER APPLICATIONS, now issued U.S. Pat. No. 8,078,910, issued on Dec. 13, 2011, the disclosure of which is hereby incorporated by reference herein in its entirety

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains to software-based checkpointing of applications running on computer systems, computer networks, telecommunications systems, embedded computer systems, wireless devices such as cell phones and PDAs, and more particularly to methods, systems and procedures (i.e., programming) for checkpointing and checkpoint-restoration of applications where the core checkpointing service is performed as a kernel service.

2. Description of Related Art

In many environments one of the most important features is to ensure that a running application continues to run even in the event of one or more system or software faults. Mission critical systems in telecommunications, military, financial and embedded applications must continue to provide their service even in the event of hardware or software faults. The autopilot on an airplane is designed to continue to operate even if some of the computer and instrumentation is damaged; the 911 emergency phone system is designed to operate even if the main phone system if severely damaged, and stock exchanges deploy software that keep the exchange running even if some of the routers and servers go down. Today, the same expectations of "fault-free" operations are being placed on commodity computer systems and standard applications.

Checkpointing is a general technique used to capture some or all of an application's state and preserve the state for use at a later time. The application state can, by way of example, be used to recovery a crashed application and to migrate, i.e. move, an application from one server to another.

In U.S. Pat. No. 7,293,200 Neary et al (Neary) disclose "Method and system for providing transparent incremental and multi-process checkpointing to computer applications". In Ser. No. 12/334,660 Backensto et al (Backensto) teach "METHOD AND COMPUTER READABLE MEDIUM FOR PROVIDING CHECKPOINTING TO WINDOWS APPLICATION GROUPS" providing similar checkpointing services to Windows applications, and in Ser. No. 12/334,634 Havemose (Havemose) teach METHOD AND SYSTEM FOR PROVIDING COORDINATED CHECKPOINTING TO A GROUP OF INDEPENDENT COMPUTER APPLICATIONS. Neary, Havemose and Backensto use a user-space checkpointer combined with interception and functionality to adjust links to libraries and files for checkpoint restore.

OpenVZ (http://en.wikipedia.org/wiki/OpenVZ) approaches checkpointing differently by providing checkpointing using a custom kernel. In other words, checkpointing is provided using a custom operating system.

Virtual Machine technology, such as VMWare, XEN and KVM, offer similar features, often using terminology such as snapshot and live migration. Virtual machine technology, however, is an entire additional software layer sitting under the operating system, which adds overhead and management complexity.

The prior art thus requires extensive functionality running in user space (Neary, Havemose and Backensto), a custom operating system (OpenVZ) or a commitment to a hardware virtualization platform (VMWare, XEN and KVM). Having a checkpointer with extensive user space components makes the checkpointer very dependent on system libraries and requires constant updating as user libraries change between releases of the operating system. Relying on a custom operating system requires application to be customized for the custom operating system, which can reduce the number of applications available to customers. Finally, a commitment to hardware/system virtualization can be expensive and change the deployment and management model of applications.

There is therefore a need for a checkpointing service that runs fully transparent to the applications, runs on standard operating systems, and operates without requiring a hardware virtualization layer. The present invention provides checkpointing as a kernel service generally loaded as a loadable kernel module working along with user-space interceptors. The kernel service may be dynamically loaded into the kernel and provides checkpointing services universally to all applications without requiring any application customizations or customization to the underlying operation system. Interceptors are loaded as part of loading the application. The kernel module checkpointer can be further optimized by modifying the kernel. Likewise, no hardware or system virtualization technology is required which keeps memory and hardware requirements minimal.

BRIEF SUMMARY OF THE INVENTION

The present invention provides systems and methods for application-checkpointing that requires no modification to the applications being checkpointed (i.e. is transparent) and works on commodity operating system and hardware. The terms "checkpointer", "checkpointing", "taking a checkpoint" and "checkpointing service" are utilized herein interchangeably to designate a set of services which 1) capture the entire state of an application and store all or some of the application state locally or remotely, and 2) restore the entire state of the application from said stored application checkpoint. The terms "checkpoint file" or "checkpoint" are utilized herein interchangeably to designate the data captured by the checkpointing service. Generally, the checkpoint files are written to local disk, remote storage, network storage or memory. In the present invention, the elements of the checkpointing services are provided as a Loadable Kernel Module (LKM). Loadable kernel modules are also called Kernel Loadable Modules (KLM), kernel extensions, or simply Kernel Modules. Throughout the rest of this document we use the terms Loadable Kernel Module and kernel module interchangeably to designate the functionality across all operating systems.

When using checkpointing to move an application from one server (the primary) to another server (the backup) the following terminology is used:

The terms "primary" and "primary application" are used interchangeably to designate the primary application running on the primary host. The host on which the primary application is running is referred to as the "primary server", "primary host" or simply the "host" when the context is clear. The term "on the primary" is used to designate an operation or activity related to the primary application on the primary server.

Similarly, the terms "backup" and "backup application" are used interchangeably to designate a backup application running on a backup host. The host on which the backup application is running is referred to as a "backup server", a "backup host" or simply a "host" when the context is clear. The terms "on the backup" or "on a backup" are used interchangeably to designate an operation or activity related to a backup application on a backup server.

The term "Live Migration" is used to designate the processes of moving a running application or a running virtual machine from a primary server to a backup server. The "migration" is "live" as the application is kept running for the majority of the move. Generally, live migration of both applications and virtual machines are planned; i.e. they are triggered in response to an event. The event may be an operator choosing to migrate the application/VM or a memory threshold being met, or other pre-defined scriptable event. For the live migration to succeed both the primary and the backup must operate during the entire live migration process.

The term "fault" is used to designate an abnormal condition or defect of a component, software, sub-system or equipment. Examples of faults include a power supply burning out, a CPU overheating, and a software bug that crashes an application. Faults can happen at any time and are thus non-deterministic, i.e. unpredictable. The term "Fault Detection" is used to designate the mechanism used to detect that a fault has occurred. Fault detection is well known in the art and is therefore not further defined herein.

The following terms are also used throughout the disclosures:

The terms "Windows" and "Microsoft Windows" are utilized herein interchangeably to designate any and all versions of the Microsoft Windows operating systems. By example, and not limitation, this includes Windows XP, Windows Server 2003, Windows NT, Windows Vista, Windows Server 2008, Windows 7, Windows Mobile, and Windows Embedded. The operation and design of Microsoft Windows is well documented on the web at msdn.microsoft.com.

The terms "Linux" and "UNIX" is utilized herein to designate any and all variants of Linux and UNIX. By example, and not limitation, this includes RedHat Linux, Suse Linux, Ubuntu Linux, HPUX (HP UNIX), and Solaris (Sun UNIX). The design and operation of the Linux operating system is well documented both on the web and at www.kernel.org.

The term "node" and "host" are utilized herein interchangeably to designate one or more processors running a single instance of an operating system. A virtual machine, such as a VMware, KVM, or XEN VM instance, is also considered a "node". Using VM technology, it is possible to have multiple nodes on one physical server.

The terms "application" "or as appropriate "multi-process application" are utilized to designate a grouping of one or more processes, where each process can consist of one or more threads. Operating systems generally launch an application by creating the application's initial process and letting that initial process run/execute. In the following teachings we often identify the application at launch time with that initial process.

As an application is a grouping of one or more processes, an application may thus be comprised of one or more other applications, each of which in turn is comprised of one of more processes. This hierarchy of application may continue to any depth without loss of generality.

In the following we use commonly known terms including but not limited to "client", "server", "API", "java", "process", "process ID (PID)" "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "http", "ftp", "Inter-process communication (IPC)", and "signal". These terms are well known in the art and thus will not be described in detail herein.

The term "transport" is utilized to designate the connection, mechanism and/or protocols used for communicating across the distributed application. Examples of transport include TCP/IP, UDP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception may be achieved by a combination of LD_PRELOAD, wrapper functions, identically named functions resolved earlier in the load process, and changes to the kernel sys_call_table. On Windows, interception may be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document the terminology interception to designate the functionality across all operating systems. The terminology pre-loading is used to designate the process of loading the interceptors into the application's address space on all operating systems.

The term "transparent" is used herein to designate that no modification to the application is required. In other words, the present invention works directly on the application binary without needing any application customization, source code modifications, recompilation, re-linking, special installation, custom agents, or other extensions.

The term "fork( )" is used to designate the operating system mechanism used to create a new running process. On Linux, Solaris, and other UNIX variants, a family of fork( ) calls is provided. On Windows, one of the equivalent calls is "CreateProcess( )". Throughout the rest of this document we use the term "fork" to designate the functionality across all operating systems, not just on Linux/Unix. In general fork( ) makes a copy of the process making the fork( ) call. This means that the newly created process has a copy of the entire address space, including all variables, I/O etc of the parent process.

The term "exec( )" is used to designate the operating system mechanism used to overlay a new image on top of an already existing process. On Linux, Solaris, and other UNIX a family of exec( ) calls is provided. On Windows, the equivalent functionality is provided by e.g. "CreateProcess( )" via parameters. Throughout the rest of this document we use the term "exec" to designate the functionality across all operating systems, not just Linux/Unix. In general, exec( ) overwrites the entire address space of the process calling exec( ). A new process is not created and data, heap and stacks of the calling process are replaced by those of the new process. A few elements are preserved, including but not limited to process-ID, UID, open file descriptors and user-limits.

The terms "barrier" and "barrier synchronization" are used herein to designate a type of synchronization method. A barrier for a group of processes and threads is a point in the execution where all threads and processes must stop before being allowed to proceed. Barriers are typically implemented using semaphores, mutexes, locks, event objects, or other equivalent system functionality. Barriers are well known in the art and will not be described further here.

Modern operating systems such as Windows and Linux separate the address space into kernel space and user space. Kernel space is the address space reserved for running the kernel, kernel extensions, and depending on operating system, device drivers. User space is the address space in which user processes (i.e. applications) run.

The context of the present invention is an application on the primary server (primary application or the primary) and zero, one or more backup servers (also called the backups). While any number of backup-servers is supported the disclosures generally describe the scenario with one backup. As is obvious to anyone skilled in the art this is done without loss of generality.

As part of loading an application for checkpointing the checkpointer kernel module is loaded if not already loaded. The checkpointer kernel module provides checkpointing services in coordination with and integrated with the operating system kernel and user-space interceptors. The checkpoints may be used to start the application again on the primary, migrate the application to a backup or recover from a fault. The backup and fault recovery use checkpoints taken by the checkpointer to restore the application to a prior state.

Another aspect of the present invention is a resource virtualization layer running as part of the interceptors.

A key element of the present invention is thus the use of kernel module to capture the state of a running application and save said application state to storage.

Another key aspect of the present invention is to use said stored application state to rebuild, also called restore, a copy of the application and let the application resume execution from said stored application state.

Another aspect of the present invention is that the checkpointing service is provided as a loadable kernel module, thus providing the checkpointing service to application as an extension of the operating system kernel without requiring any application customizations or customization of system libraries. Yet another aspect of the present invention is that the checkpointing service may be built into the kernel, thus also offering the checkpointing service to applications as a built-in operating system service.

A related aspect is that the present invention provides hybrid kernel-space and user-space application checkpointing, as the kernel module operates along with the user-space library to perform the checkpointing.

Yet another aspect of the present invention is during a restore from a checkpoint the checkpointer kernel module adjusts kernel state for the particular application based on the checkpoint.

Another aspect of the present invention is that the checkpointer kernel module can be unloaded to free up memory when the checkpointing services no longer are needed.

A further aspect of the present invention is that it can be provided on commodity operating systems such as Linux and Windows, and on commodity hardware such as Intel, AMD, SPARC and MIPS. The present invention thus works on commodity operating systems, commodity hardware with standard (off the shelf) software without needing any further modifications.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 10 is a block diagram illustrating various deployment scenarios.

DETAILED DESCRIPTION OF THE INVENTION

Referring more specifically to the drawings, for illustrative purposes the present invention will be disclosed in relation to FIG. 1 through FIG. 10 It will be appreciated that the system and apparatus of the invention may vary as to configuration and as to details of the constituent components, and that the method may vary as to the specific steps and sequence, without departing from the basic concepts as disclosed herein.

0. Introduction

The context in which this invention is disclosed is an application running on a primary server. Without affecting the general case of multiple primary applications, the following disclosures often depict and describe just one primary application. Multiple primary applications are handled in a similar manner.

Likewise, the disclosures generally describe applications with one or two processes; any number of processes is handled in a similar manner. Finally, the disclosures generally describe one or two threads per process; any number of threads is handled in a similar manner

1. Overview

Figure 1:
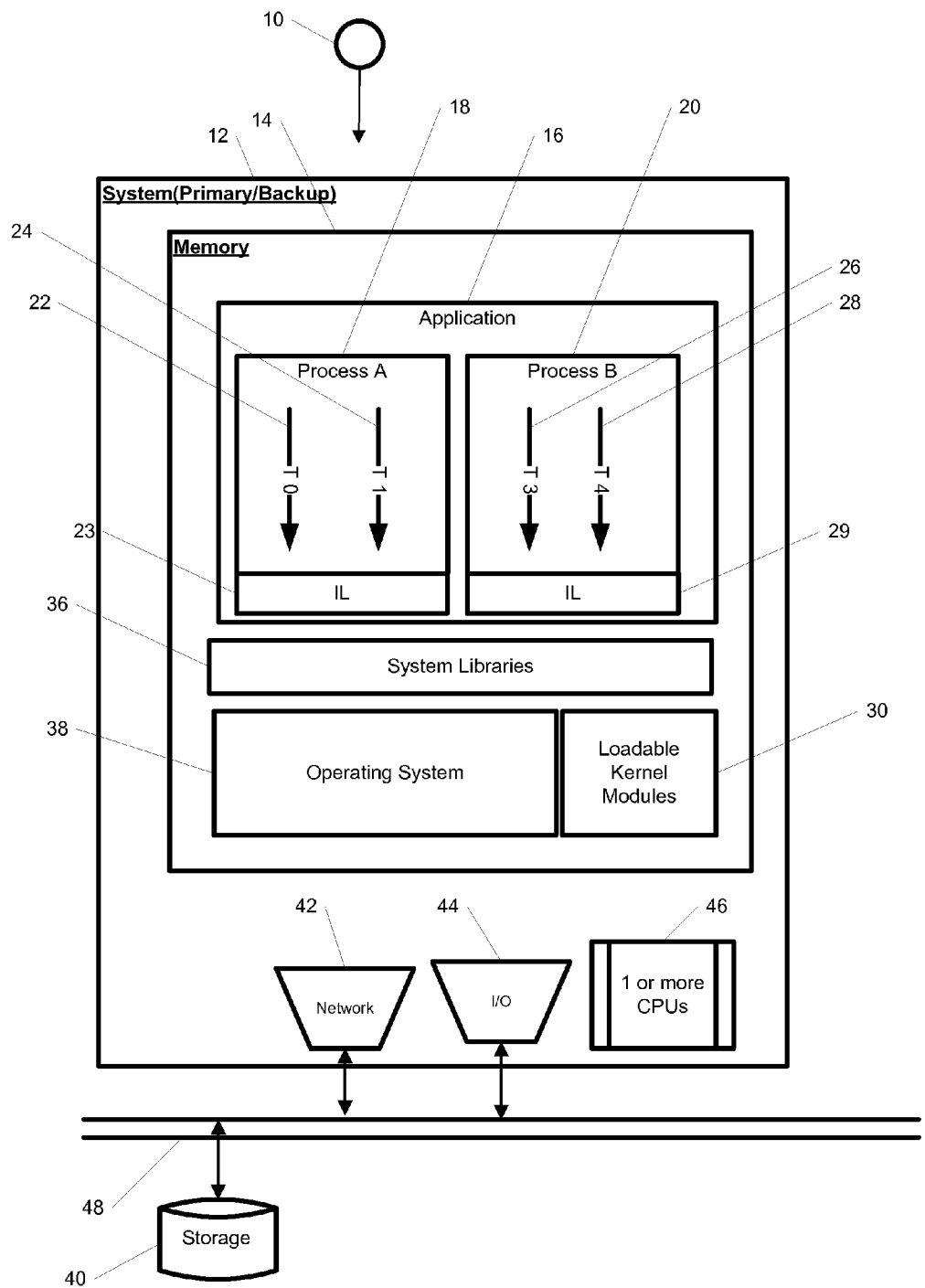
FIG. 1 is a block diagram of the core system architecture

FIG. 1 illustrates by way of example embodiment 10 the overall structure of the present invention. The following brief overview illustrates the high-level relationship between the various components; further details on the inner workings and interdependencies are provided in the following sections. FIG. 1. Illustrates by way of example embodiment 10 a primary server 12 with an application 16 loaded into system memory 14. The application 16 is comprised of two processes; process A 18 and process B 20. Each of the two processes has two running threads. Process A contains thread T0 22 and thread T1 24, while process B is contains thread T3 26 and thread T4 28. As part of loading the application 16 an interception layer (IL) 23, 29 is pre-loaded into the address space of each process. Interception Layer 23 for process A is preloaded into process As address space and Interception Layer 29 is preloaded into process B's address space. The system libraries 36 are generally interposed between the application 16 and operating system 38. Alongside with the operating system 38 are the loadable kernel modules 30.

System resources, such as CPUs 46, I/O devices 44, Network interfaces 42 and storage 40 are accessed using the operating system 38 and the loadable kernel modules 30. Devices accessing remote resources use some form of transport network 48. By way of example, system networking 42 may use TCP/IP over Ethernet transport, Storage 40 may use Fibre Channel or Ethernet transport, and I/O 44 may use USB.

The architecture for the backup is identical to the primary, In the preferred embodiment storage 40 is external and accessible by both primary and backups over a network 48.

FIG. 1 illustrates the system libraries 36 as separate from the application 16 and the individual processes process A 18 and process B 20. The system libraries are generally shared libraries. For clarity of presentation, the system libraries are depicted outside the address space of the individual processes, even though some library state and code is present within the address space of the individual application processes.

In an alternate embodiment the functionality of the kernel module 30 is built into, i.e. compiled into, the kernel. This eliminates the need to load the kernel module, at the expense of being custom kernel. The preferred embodiment disclosed herein provides checkpointing services as a kernel module, but it is obvious to anyone with ordinary skills in the art the kernel module functionality could be compiled into the kernel as disclosed for the alternate embodiment.

Figure 2:
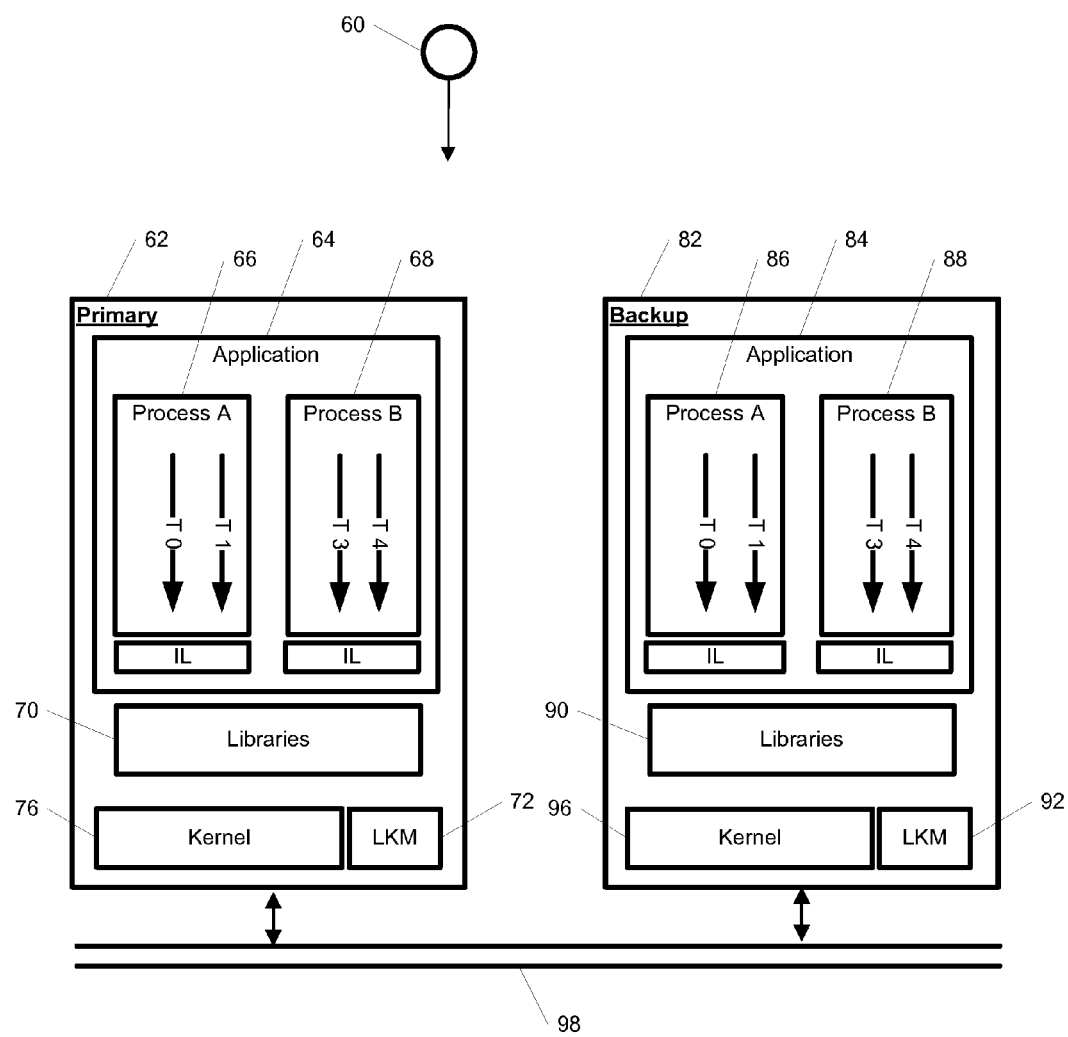
FIG. 2 is a block diagram illustrating a pair of primary and backup

FIG. 2 illustrates by way of example embodiment 60 a primary server 62 and its corresponding backup server 82 working as a pair of primary and backup. The primary application 64 is comprised of two processes; process A 66 and process B 68, each with two running threads and an interception layer. System libraries 70 on the primary are interposed between the application 64 and the operating system kernel 76. Loadable kernel modules 72 are loaded by the kernel 76 as needed.

Using a similar architecture, the backup server 82 contains the backup application 84 comprised of process A 86 and process B 88 each with two threads and interception layer. System libraries 90 are interposed between the application 84 and the operating system kernel 96. Loadable kernel modules 92 as loaded by the kernel 96 as needed.

Primary and backup communicate over one or more network connections 98.

2. Kernel Structure

Linux and Windows are two dominant operating systems with different kernel architectures. Linux is build around a monolithic kernel with loadable kernel modules, while Windows is built around a micro kernel with a core executive. As with Linux, Windows supports loadable kernel modules and kernel-mode drivers. Both Windows and Linux thus enable drivers and modules to run in kernel space.

2.1 Memory

On the Linux operating system applications running in user space communicate with the kernel through defined kernel interfaces. The kernel interfaces are generally concealed by the system libraries as far as the applications in user space are concerned. On Windows, the Windows system libraries exemplified by the Win32 and Posix subsystems likewise manage the interfaces to kernel functionality. Generally, a user-space application doesn't need to concern itself with kernel behavior; it simply requests kernel services through the system libraries.

Both the Linux and Windows kernels and system libraries are well documented and only the elements relevant for the present invention will be further described.

On a 32-bit operating system an application can generally address the full 4 GB of memory corresponding to the 32 bits of address space, even if the underlying hardware provides less than 4 GB of memory. As a practical matter Linux reserves the upper 1 GB of memory for the operating system, while Windows generally reserves the upper 1 or 2 GB for the operating system. The available physical memory is first mapped into the address space of the kernel, and the kernel is then proving a flat virtual 4 GB address space for the application. For 64-bit operating systems and hardware similar considerations apply, other than the address space is 64 bits instead of 32 bit. The kernel maintains said mapping between application virtual addresses and physical memory addresses. The virtual address space of is broken into equal sized portions called pages by the kernel. Physical memory is likewise broken into similar sized pages, called page frames. On IA32 systems the page size is 4 kb (4096 bytes). Other architectures may have different page sizes. In the following PAGE_SIZE is used to designate the page size on all platforms. The present invention relies on this mapping to locate and extract application memory image as part of checkpointing while running within the context of the kernel. Generally, the address space when viewed from an application process's perspective is called process virtual memory or process address space, while the underlying physical memory of the host system is called physical memory.

Figure 3:
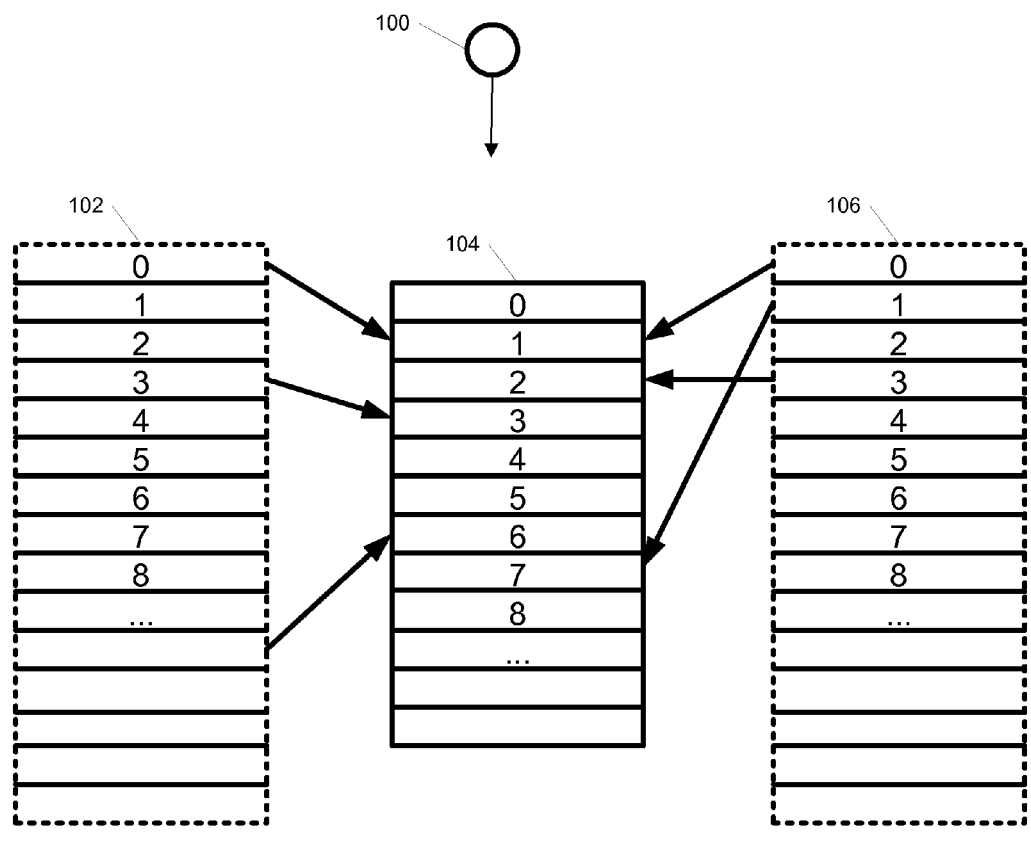
FIG. 3 is a block diagram illustrating virtual and physical memory and their mappings

FIG. 3 illustrates by way of example embodiment 100, the relationship between process virtual memory and physical memory. Process A's virtual memory 102 is broken into pages. Each allocated page in virtual memory is mapped to a page in physical memory 104. By way of example page zero in process A's virtual memory 102 is mapped to page frame 1 in physical memory, and page 3 in process A's virtual memory is mapped to page frame 3 in physical memory. Process B's virtual memory 106 page address zero is mapped to page frame 1 in physical memory while page 2 in virtual memory is mapped to page frame 7 in physical memory. Page frames in physical memory may be shared between two processes as illustrated for page frame 1. While nomenclature and some of the finer details vary between operating systems, the disclosures above generally describe the mechanics on Linux and Windows and the nomenclature set forth is used in the following for teachings on both Linux and Windows.

2.2 Resources and Processes

Each process has resources attached. By way of example, on the Linux operating system, information related to a running process is captured and stored in the task_struct structure or can be retrieved via said task_struct. Some of the data kept in the task_struct is process execution status, process hierarchy, allocated memory, process credentials, memberships, signals, resources in use and thread information. As the task_struct is a kernel data structure the information stored within is generally not accessible by applications running in user space. Applications can access some of the elements using system calls abstracted out within the system libraries. Data within the task_struct, however, is accessible when running in kernel mode, a fact the present invention builds on.

The kernel also maintains a list of all running processes called the kernel task list. In newer versions of the Linux kernel the kernel task list is private and can therefore not be directly accessed. The present invention does therefore not rely on the global kernel task list; rather it relies only on the local task_struct for the process currently being accessed and uses a user-space library to coordinate access to different processes.

2.3 Device Drivers

Device drivers provide implementation of hardware specific interfaces.

Both Linux and Windows provide generic device support and impose certain architectural constraints on drivers in order to provide universal support for a large number of drivers. By way of example, operating systems provide device drivers for access to hard disks, CD ROM drives, USB, internal and external peripherals. By way of example, when an application opens a file, a device driver is ultimately responsible for retrieving or writing data to said file.

Device drivers thus enable access to very specific resources using well-defined mechanisms offered by the kernel and abstracted out by the system libraries. Device drivers run as part of the kernel either built in or dynamically loaded as a loadable kernel module. As such, device drivers have access to the kernel internals and can inspect and manipulate kernel structures. The present invention builds on these facts to offer checkpointing services, where key elements of said checkpointing services are provided as a checkpointing device driver.

Figure 4:
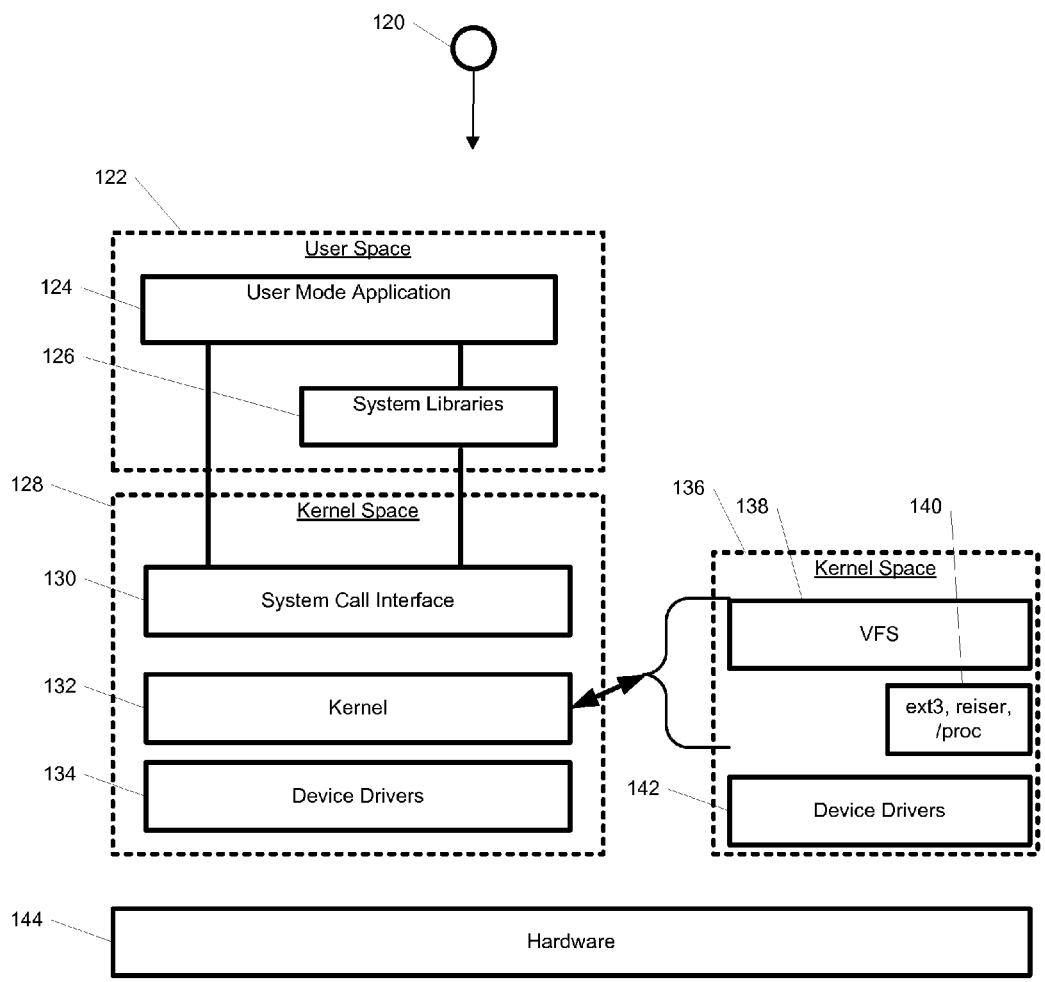
FIG. 4 is a block diagram illustrating use of the virtual file system

FIG. 4 illustrates by way of example embodiment 120 the structure on the Linux operating system. An application 124 runs in user space 122. Kernel functionality is accessed either directly from the application through sys calls, or through the system libraries 126. Within kernel space 128, the System Call Interface 130 receives and processes the system call. The system call is translated into a call into the kernel 132, where it's processed, eventually passed through one or more device drivers 134 and the underlying hardware 144 is accessed. For many devices, the Virtual File System (VFS) is used a common abstraction. The VFS 138 is a kernel module 136 and provides a "standard file system" that defines services and interface many devices must support. VFS is generally mounted over a file systems such as ext3, ext4 and reiser 140 for block devices, and directly over the character driver for a character device. Even virtual file system, such as the /proc file system, is provided within the context of VFS. VFS and the extended file systems ultimately rely on one or more device drivers 142 to access the storage media 144.

As illustrated in the example embodiment 120 on FIG. 4 user-space application never directly access the device driver; rather the device driver is accessed going through standard kernel interfaces (System Call Interface) using abstractions such as VFS. The present invention utilizes the VFS abstraction as well, and provides checkpointing, that from the applications perspective looks like reading files from a file system. Likewise, restoring checkpoints looks like writing a file to a file system.

3 Checkpointing Device Driver Introduction

In the following disclosures we follow the Linux naming convention, where device drivers are installed in the "/dev" directory. In the following disclosure the checkpointer device driver is named "ckpt" and the full pathname is thus "/dev/ckpt". The actual device name is not important as long as it's different from other device names supported by the kernel and available in the /dev or other directory.

By way of example, /dev/ckpt is implemented as a character device. The disclosed functionality of /dev/ckpt could also be implemented as a block device, which is obvious to anyone with ordinary skills in the art. Therefore, the preferred embodiment uses a character device while an alternate implementation uses a block device. Character devices and block devices are both known in the art and the following disclosures will thus focus on aspects relevant to the present invention.

A character device is identified by its major device number. By way of example, the following teachings use a major device number of CKPT_MAJOR_NUM. For testing purposes the locally reserved numbers in the range 240 to 254 can be used. By way of example on the Linux operating system, the device node is create as mknod /dev/ckpt c CKPT_MAJOR_NUM 0

3.1 File Operations

The internal structure of a device driver must declare the file_operations supported by the device. By way of example, ckpt file_operations is defined as follows:

struct file_operation ckpt_fops={
    .owner=THIS_MODULE,
    .open=ckpt_open,
    .release=ckpt_release,
    .read=ckpt_read,
    .write=ckpt_write,
    .ioctl=ckpt_ioctl,
    .seek=ckpt_seek,
    };

Here each of the device driver functions ckpt_open, ckpt_release, ckpt_read, ckpt_write, ckpt_ioctl and ckpt_seek are assigned to their respective file_operations.

ckpt_open is used to initialize the device driver, ckpt_release to release all resources associated with the device before taking the device down. ckpt_read and ckpt_write are used to read and write bytes of data respectively, ckpt_ioctl is used to query the device driver for special status information, and ckpt_seek is used to reset the current position in the device. Finally THIS_MODULE identifies the module.

In addition to open/read/write/release calls, the /dev/ckpt also contains kernel module initialization. The module initialization and termination is often called module_init( ) and module_exit( ) in reference to the commonly found declarations in kernel modules. By way of example the following teachings use the terminology ckpt_module_init( ) and ckpt_module_exit( ) for said functions of within the context of the present invention.

In the preferred embodiment ckpt_module _init( ) call registers the device with the operating system.

```
static int _init ckpt_module_init(void)
{
  int ret;
  if ((ret=register_chrdev(CKPT_MAJOR_NUM, "ckpt",
      &ckpt_fops))<0)
    printk(KERN_ERR "ckpt_module_init: %d\n",ret);
  return ret;
}
```

The register_chrdev call provides the registration information that allows the operating system to map the /dev/ckpt to the actual device driver.

Similarly ckpt_module_exit ( ) unregisters the module with a preferred embodiment as

```
static void _exit ckpt_module_exit(void)
{
  unregister_chrdev(CKPT_MAJOR_NUM, "ckpt");
}
```

3.2 Conceptual Use of /dev/ckpt

By way of example, the /dev/ckpt checkpointer module may be loaded using the standard Linux command insmod and the /dev/ckpt checkpointer may be unloaded using the Linux command rmmod. Both command are well known in the art and will not be described further herein.

Figure 5:
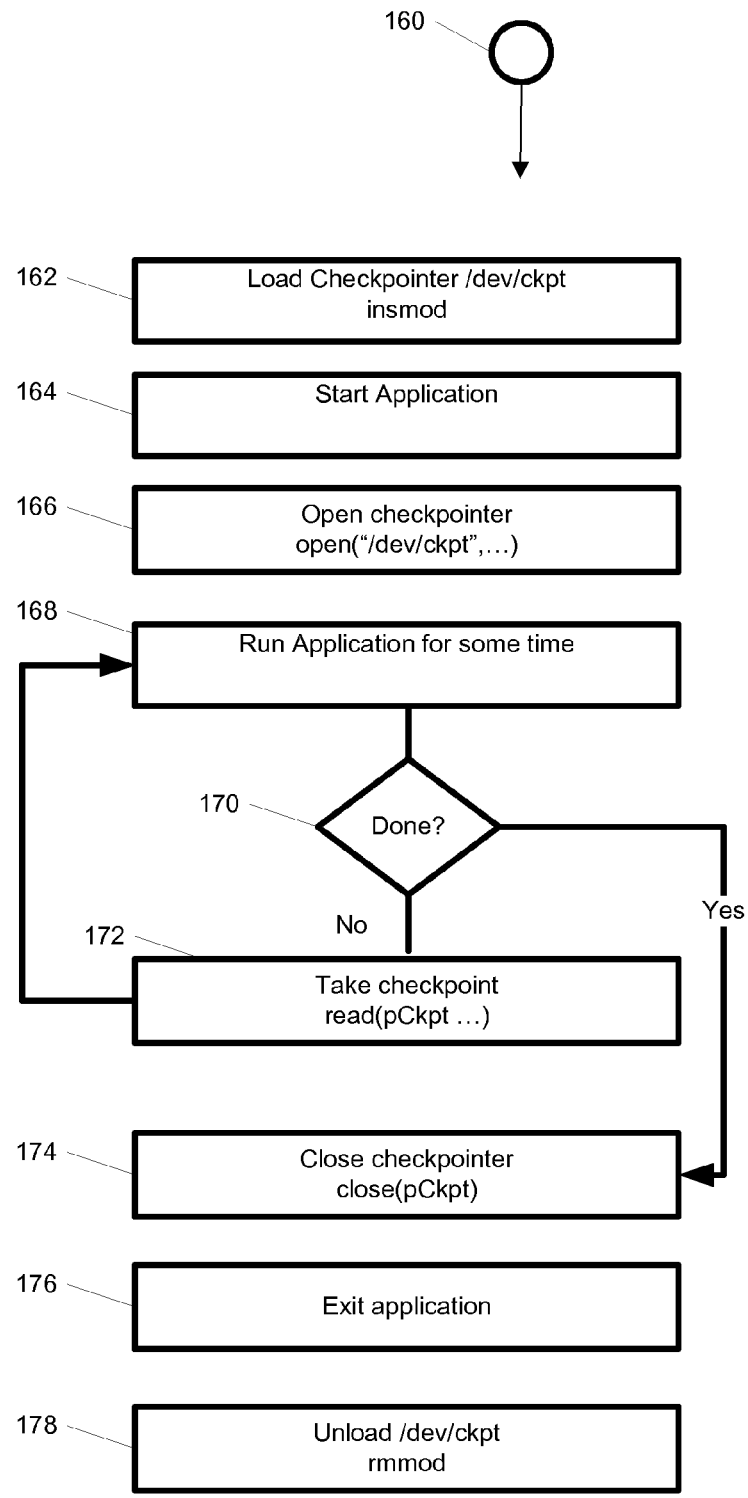
FIG. 5 is a block diagram illustrating the checkpointing process

The /dev/ckpt checkpointer is accessed from user space like any other file or device. In the preferred embodiment the checkpointer is opened, ignoring error handling, using code similar to pCkpt=open("/dev/ckpt",O_RDWR);

and the checkpointer is closed using code like close(pCkpt);

In the preferred embodiment, a checkpoint is created by reading from /dev/ckpt using code like readCount=read(pCkpt,buffer,size);

and a restore from checkpoint is accomplished by writing to /dev/ckpt using code like writtenCount=write(pCkpt,buffer,size);

FIG. 5 illustrates by way of example embodiment 160 the overall flow of the checkpointing process. First 162 the /dev/ckpt checkpointer module is loaded using, by way of example, the insmod command. The application is then started 164. As part of loading the application interceptors are loaded containing the user-space components of the checkpointer. The checkpointer is started 166 by way of the /dev/ckpt open command. The application is then let run 168 for some period of time. If the application is not finished processing 170 the checkpointer is activated 172. A checkpoint is taken through the /dev/ckpt read command 172, and the application let run again 168. If the application is done running 170 the checkpointer is closed 174, the application exited 176 and the /dev/ckpt checkpointer unloaded using by way of example rmmod.

The finer details of the checkpointing process and its interaction with the user-space interceptors are disclosed in the next sections.

4.0 User-Space Shared Library

On the Linux operating systems new processes are created by the combined use of fork( ) and exec( ) On Windows, processes may be created by using the createProcess( ) call. As described above, the disclosures of the present invention use the terminology fork( ) and exec( ) to designate the process creating interfaces on all operating system.

The user-space functionality is pre-loaded as a library as part of initially loading the initial application process and later every time a new process is created. The user-space library provides the following functionality a. Creation of a dedicated checkpointing thread for each process b. Preparation of Barrier for process and threads within process c. Collection of checkpoint data by calling /dev/ckpt d. Flushing of system resources e. Resource virtualization, Application Virtualization Space (AVS).

As part of checkpointing, the present invention deterministically halts execution of the application being checkpointed. Halting of a multi-process multi-threaded application is achieved using barrier synchronization (as defined in "Brief summary of Invention"). The use of Barrier synchronization for halting a multi-process multi-threaded application is taught in U.S. Pat. No. 7,293,200 Neary et al and included in its entirety by reference. The use of a barrier within the context of the present invention is disclosed below.

Where Neary et al. provides the actual checkpointing facility in a "check point library" running in user-space, the present invention provides the core checkpointing facility as a kernel module. The present invention utilizes the barrier from the Neary, and eliminates the need for the checkpointer to run in user space. Moving the checkpointer from user-space to kernel-space has several advantages: 1) it essentially removes the dependency on the system libraries found in Neary, 2) it eliminates the need to closely track application and library interactions, as all checkpointing is done in the kernel sitting under the system libraries, and 3) it automatically includes all memory allocated in the address space of the application without the need to special case stacks, code, text and shared memory.

The present invention creates a checkpointing thread per process as taught in Neary. However, contrary to Neary, the checkpointer thread calls the /dev/ckpt to collect the checkpoint and does not itself create the checkpoint for its parent process.

Figure 6:
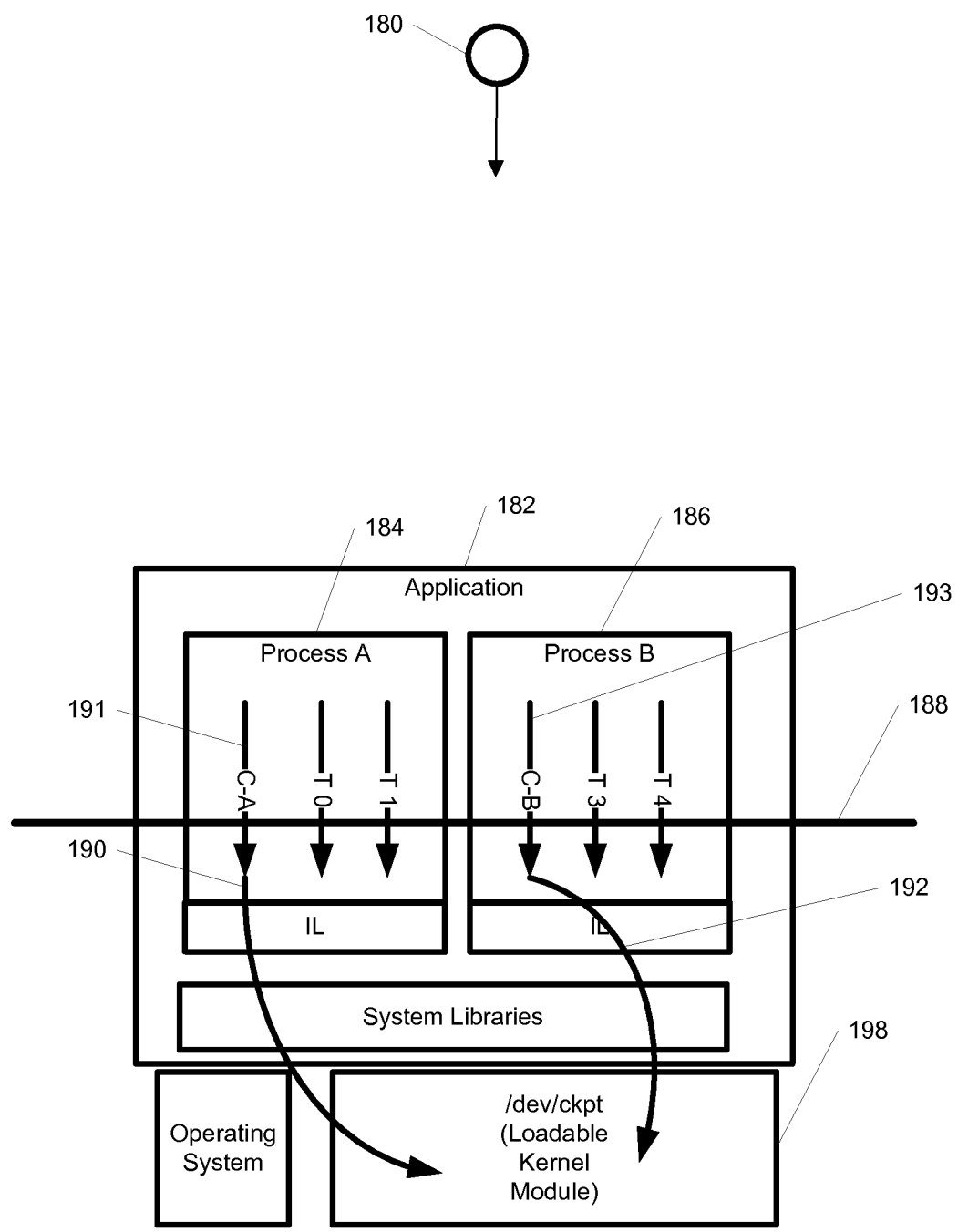
FIG. 6 is a block diagram illustrating the interaction of the barrier, checkpointer threads, and kernel module.

FIG. 6 illustrates by way of example embodiment 180 an application 182 with two processes, process A 184 with two threads T1 and T2 and process B 186 with two threads T3 and T4. Process A additionally contains the checkpointer thread C–A 191 and process B contains checkpointer thread C–B 193. The Barrier 188 indicates a place in the execution of process A, process B and threads T1, T2, T3 and T4 where all processes and threads are halted. With all activity in user space halted at the barrier, the kernel module checkpointer (/dev/ckpt) 198 can collect all relevant process state and build a checkpoint. Each process collects its own checkpoint via the kernel module as indicated for process A 190 via its checkpointer thread C-A 191 and process B 192 via its checkpointer thread 193

In contrast to Neary and Backensto, the user-space library of the present invention contains only the barrier, checkpointer thread, flushing, AVS and collection of checkpoint data. There is no need to keep track of memory allocations, including those hidden within the system libraries, as all checkpointing data is collected in the kernel. This is a dramatic simplification over the user-space checkpointer and does not require customized system libraries.

4.1 Flushing TCP/IP

By way of example, if an application uses TCP/IP with the socket-programming model, select TCP and socket state and data are implicitly included in the application state, even though the data may reside in the TCP stack or associated device driver. As previously disclosed, the present invention does not attempt to access kernel structures for non-application processes and thus approaches the problem of the TCP and socket state from the application layer. While application and socket buffers generally are included in the applications memory image that is not the case for kernel and device buffers related to the lower levels of the TCP/IP stack and the network device itself. In the preferred embodiment the approach taken is to flush all TCP and socket communication in order to move data through the buffers thereby ensuring that the buffers outside the application are in a consistent state with respect to the application. Flushing of TCP sockets may be achieved in a number of ways including but not limited to closing the socket, which forces a flush and then reopening the socket, setting the TCP_NODELAY socket option or through application specific flush operations. In an alternate embodiment the TCP and device kernel buffers are extracted in kernel module without requiring any flushing operations.

Resources accessible from the task_struct can be flushed directly by the kernel module checkpointer and does therefore not need flushing from user space. Only resources with kernel functionality outside the task_struct, such as TCP/IP, require flushing from user space.

Generally, resources are flushed as part of the checkpointing process in order to move data out of low-level buffers located outside the address space of application processes, through the operating system and onto or into the devices.

4.2 Application Virtualization Space—AVS

Instantiated resources generally are only meaningful in the context of the operating system where the application is running.

By way of example the operating system assigns each process a unique process ID (PID). At any point in time each process on a particular node has a unique process ID. If the process is stopped and re-started it may not get the same PID. Likewise, if the process is started on a different node, the PID may be different. Some applications query the operating for their own PID and use the PID for a variety of purposes. For a checkpoint image to be meaningful, it's thus important that the PID is presented to applications with the value it had at the time of taking the checkpoint.

A structure called the Application Virtualization Space (AVS) is used, to continue to example, to store the PID at the time the process is created and when the PID is accessed at later time through the defined APIs, to retrieve it from the AVS.

At the time the process, and thus the PID, is first created the PID is recorded within the AVS for the particular process and kept associated with process as long as it's running. When the process calls getpid( ) to get the associated PID, the values stored in the AVS is returned, as opposed to the PID provided by the underlying operating system. This ensures that dependencies on PIDs are virtualized and preserved across checkpoints. Similar teachings apply to thread IDs (TIDs), and other system constructs such as IPC, signal, and named semaphores.

Files are handled in a similar manner. By way of example, the file name, path, and attributes are stored in the AVS. As part of restoring an application from a checkpoint, the contents within the AVS is used to recreate the data structures used by the operating system to represent the file, i.e. the file's name, path, and attributes. Current file state, such as file position, is contained within the checkpoint and does not need to be included in the AVS; the AVS only needs the minimal information required to re-create the resource and the checkpoint then contains the current state.

Similarly, network state such as state of sockets, may be included in the AVS. As with files, only the data relevant to re-creation of the resource is required, while current state is contained within the checkpoint.

The AVS entries are created when resources are created or opened, and removed from the AVS when the resource is closed. By way of example, this means that the AVS entry for a file is created when the file is opened, and removed when the file is closed. The AVS is generally not involved with individual file operations, such as reading or writing data, only in creating file pointers that are meaningful in the context of the operating system and the associated checkpoint.

The AVS thus contains an application-specific private name space for resources, and maintains mappings between resources within the initial instances of application resources and their possibly different values when running in a different environment at another time. In the example embodiment, the AVS mappings are implemented using a hash table. In other embodiments the AVS is implemented using a database or custom coding.

5. Checkpointing in Kernel Module /dev/ckpt

As disclosed in section 3 the read( ) method of /dev/ckpt is called to retrieve checkpoint data from the kernel. As disclosed in section 4, read( ) is called within the barrier, so the underlying process is not executing application code.

As taught in section 2 all state information for a particular process is stored in or can be found from the process's task_struct structure. By way of example on the Linux operating system, the task_struct for the current process can be found by the current macro. In continuation of section 3 an example embodiment, without error handling, of the read function for /dev/ckpt is

```
static ssize_t ckpt_read(struct file *filp,
char *ubuff, size_t count, loff_t *f_pos)
{
// pMem is a pointer to memory seen from
// the kernel
Set pMem to the current address in filp
// copy to user space
eCount=copy_to_user(ubuff,pMem, count)
nBytes=(eCount==0)? count:(count+eCount);
*f_pos+=nBytes;
return count
}
``` copy_to_user( ) returns zero if count bytes have been copied or -eCount if only ecount bytes were transmitted. nBytes represents the number of bytes actually transferred to user space. In an alternate embodiment a page is memory mapped into user-space and the checkpoint data copied directly into said memory mapped page.

Generally, attempting to access a memory location not allocated to the process causes a page fault. However, copy_to_user( ) specifically deals with this issue by validating addresses before the copy operation. If the page is invalid, i.e. the linux function access_ok( ) returns zero, copy_to_user( ) does not attempt to access the page, and the function returns without attempting to copy data. It is thus not necessary to check every page before attempting to copy.

In an alternate preferred embodiment, the page data is transferred to user-space using memory mapped pages.

Each of these steps are now disclosed in further detail.

5.1 Collecting Memory State

The process's task_struct contains a data structure mm_struct which contains the relevant information regarding said process's virtual memory. The mm_struct contains the kernel data structures necessary to determine which memory pages are used by the process.

By way of example, the start and end of code may be found using the start code and end code variables, the start and end of data with the start_data and end_data, the start and end of the heap with start_brk and brk. Similar variables may exist for stack, environment and arguments.

As memory is organized in pages within the kernel, the most efficient operation of /dev/ckpt is in units of memory pages, as opposed to units of bytes. However, since the core device read( ) operations operates in units of bytes, the calling process preferably aligns calls to read( ) on page boundaries and requests blocks of bytes with the size of a page. In the preferred embodiment, a call to read( ) may thus look like read(filp,ubuff,PAGE_SIZE,p_pos). The read( ) function return the number of bytes read as a means of communicating success or error. If e.g. zero (0) is returned, it means that zero bytes were actually read into ubuff.

By way of example embodiment, and in continuation of the example in section 3.2, the calling process may call /dev/ckpt with pseudo code like unsigned byte ubuff[PAGE_SIZE];
// open device
// set/reset filepos to zero.
seek(fp,0);
for(int i=0; i<maxMem; i+=PAGE_SIZE) {
count=read(fp,ubuff,PAGE_SIZE)
// if (count>0) save checkpoint of page
// currently in ubuff
}

The /dev/ckpt driver may optimize the checkpointing process by using the previously disclosed information about start and end of code, text, stack etc. The checkpointer may thus check the address of the current read request to verify that it falls outside the pages used by the process and if that is the case, immediately return a value of zero to indicate that no application process data was available for the requested read( ) operation. A related optimization is that on some operating systems such as Linux a certain number of pages in low memory are left unused to catch null-pointers. Similarly, the operating system kernel may, by way of example, reside in the upper or lower 1 GB of the memory address space and may thus be skipped by the checkpointer. Each operating system is slightly different, and may offer opportunity for such simple optimizations of the checkpointing process.

In the example, the user-space buffer ubuff is fixed and pre-allocated, and thus automatically included in the checkpoint as well. However, since ubuff is used in a transient manner with data flowing through, its content does not need to be preserved as part of a checkpoint.

5.2 Flushing of System Resources

In the preferred embodiment disclosed above, TCP/IP connections are flushed from the user-space library. Other system resources, such as IPC is generally contained within the task_struct and can thus be captured by /dev/ckpt by accessing resource within the address space of the current process. Examples include, but are not limited to the System V semaphores sysvmem, open files identified by *files and state of signal handlers. In these cases /dev/ckpt can access the resource internals and flush buffers as supported by the device.

5.3 Integration with User-Space Library

As disclosed above the kernel module checkpointer /dev/ckpt is called by the checkpointing thread for a process to collects a specified number of memory bytes, typically a page, for said process. The /dev/ckpt checkpointer does thus not need to access the address space of any other processes, nor does it need to know about other processes.

Conversely, the user-space library is responsible for coordination across all processes comprising an application. The barrier contained within the user-space library brings every application process and thread into a stable locked state where the application processes and threads do not execute. With the application essentially halted, the checkpointer thread for each process can call /dev/ckpt and assemble the memory pages comprising the application image.

5.4 Deterministic Halting at the Barrier

Figure 7:
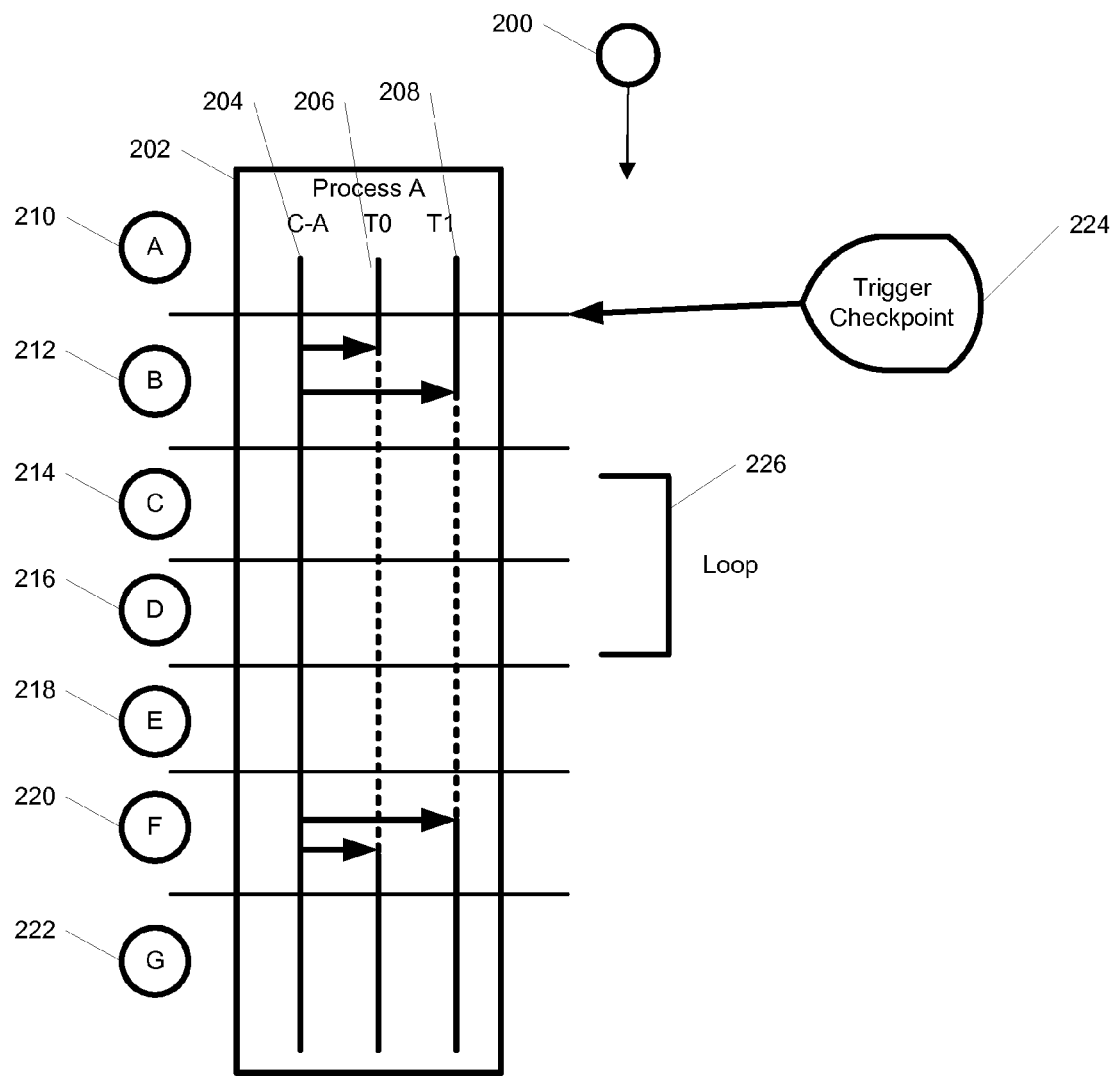
FIG. 7 is a block diagram illustrating the barrier.

The inner working of the barrier as it relates to the checkpointing process is now disclosed. FIG. 7 illustrates by way of example embodiment 200 an application with one process 202 containing to process threads T0 206 and T1 208 and the checkpointer thread 204 as disclosed above. Multiple processes are handled in a similar manner.

Initially the application the process is running A 210 with the checkpointer thread 204 and the two process threads 206, 208 operating. At some point a checkpoint is triggered 224. The checkpoint trigger activates the barrier and transitions into waiting B 212 for T0 and T1 to stop at the barrier. When both T0 and T1 are stopped at the barrier the checkpointing thread 204 starts assembling the checkpoint C 214. As disclosed previously, the checkpoint assembly comprises collecting memory and kernel state for the process 202. Kernel buffers are flushed and relevant state information saved along with the memory state. Said checkpoint state is then written to disk D 216. In the preferred embodiment disclosed previously states C 214 and D 216 are interleaved, in that one or more memory pages repeatedly are collected then written to disk. That loop is indicated with the callout 226 next to state C and D. If a kernel device had to be halted as part of flushing, the device is activated again E 218, and the checkpointer transitions to state F 220 where individual threads T0 and T1 are released in reverse order from the barrier. Upon being released, the application process 202 runs again G 222.

6. Structure of Checkpoint

The checkpoint of a multi process application is comprised of state global to the operating system, state shared across all processes within the application, and state for each process including the state of all threads within said process.

Figure 8:
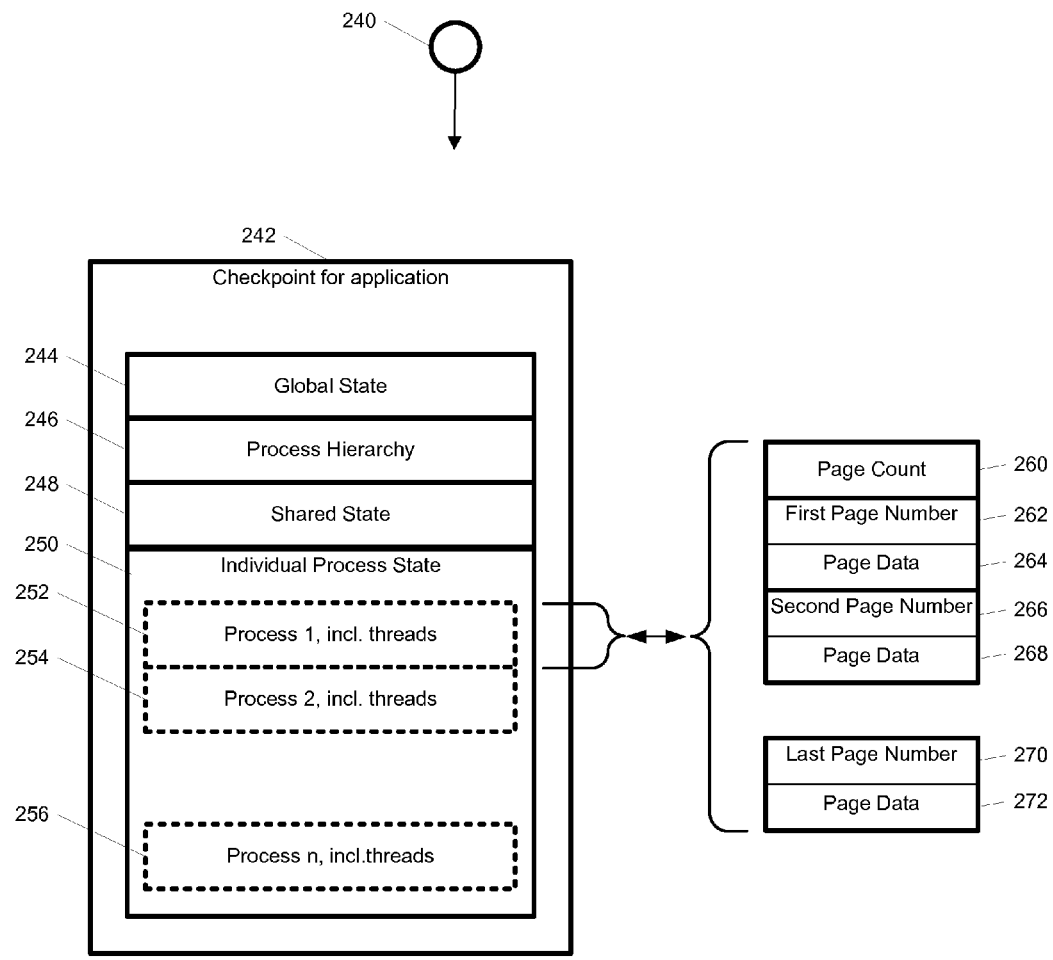
FIG. 8 is a block diagram illustrating the structure of a checkpoint.

FIG. 8 illustrates by way of example embodiment 240 the structure of an application checkpoint 242. The checkpoint is comprised of state global to the operating system 244. This includes the AVS and other data that is system global. The process hierarchy 246 contains the hierarchy of processes comprising the application and shared data 248 contains information on all shared data between processes within the application. Examples of shared data include names of shared semaphores, shared memory etc. The checkpoint data for the individual processes 250 is comprised of individual checkpoints for each process. By way of example, the checkpoint for process 1 252 is followed by the checkpoint for process 2, and so on until the last process, process 'n' 256.

FIG. 8 also illustrates by way of example embodiment 240 the layout of the checkpoint for individual processes. By way of example the checkpoint for process 1 252 is comprised of the following data. First the total number of pages in the checkpoint 260 is provided as a means of boundary checking and error recovery. Pages included in the checkpoint are identified by their page number. If a page number is provided, it means that said page is included in the checkpoint. If a particular page number is missing, it means said page is not included in the checkpoint. The page number of the first page in the checkpoint 262 is followed by the data contained in said first page 264. This is followed by the second page 266 included in the checkpoint and the data contained in said second page 268. The same layout is followed until the last page 270 is reached and the data contained in said last page 272.

The layout of the individual process checkpoints in the just disclosed example embodiment allows for saving of only those pages used by the application, and thus supports the checkpointer optimizations previously disclosed in section 5.1.

Methods for storing the hash tables as used by AVS are well known in the art and will thus not be discussed in further detail. Likewise, methods for storing trees, as used by the process hierarchy, are well known in the art and will thus not be discussed further.

7. Restoring from Checkpoint

Figure 9:
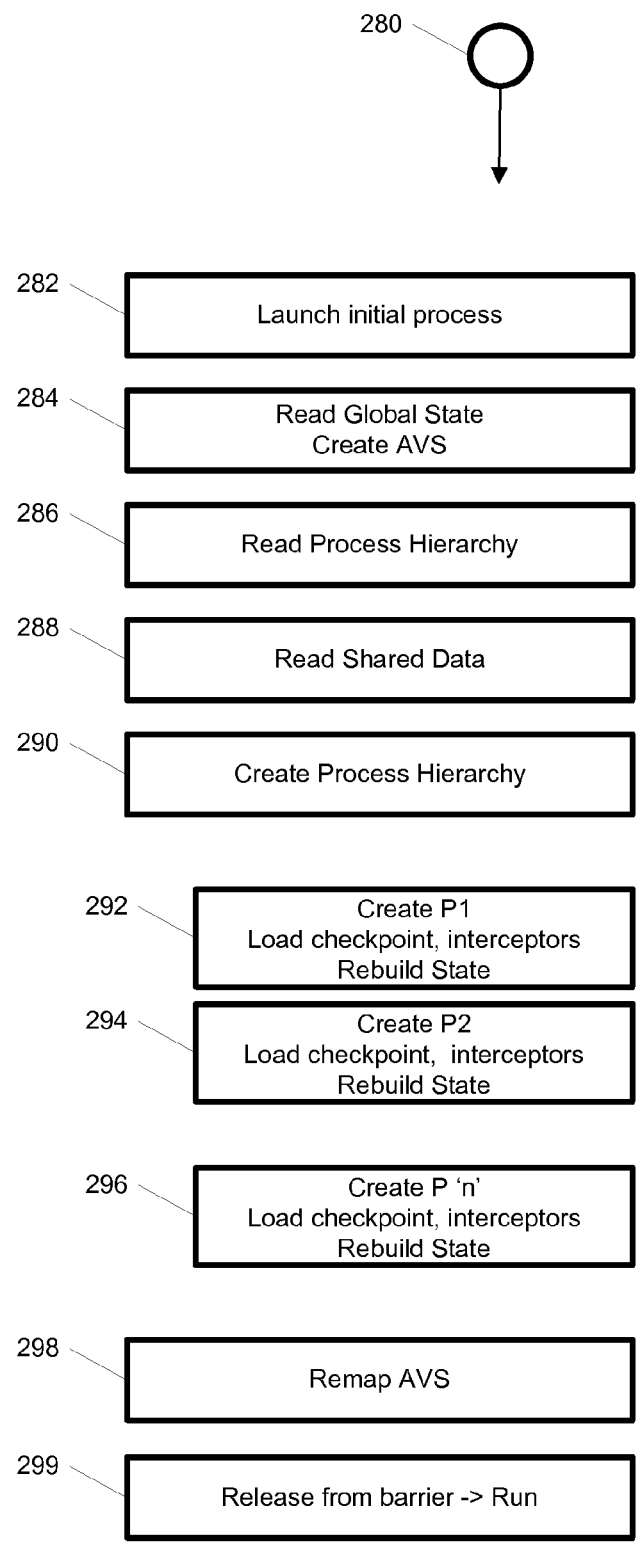
FIG. 9 is a block diagram illustrating restoring a checkpoint.

FIG. 9 illustrates by way of example embodiment 280 the processes by which an application is restored from a checkpoint. First, the initial process 282 is created. The initial process is responsible for reading the checkpoint and creating the application processes. The initial process first read the global checkpoint data 284 including the AVS. The AVS is required before creating any of the true application processes, as the virtualization subsystem may be queried by the individual component processes. This is followed by reading the process hierarchy 286 and the data shared between application processes 288. At this point the initial process is able to recreate the individual processes that comprise 290 the application as it has loaded the process hierarchy. The individual component processes are then created, the checkpoints overlaid, interceptors installed and state rebuild. The process rebuilding is first performed for the first process in the hierarchy P1 292, followed by the second process P2 294, and eventually finishes with the last process Pn 296. When, by way of example, process P1 is created, checkpoint loaded, interceptors installed and state rebuilt, it is done within the process hierarchy 290 as provided in the checkpoint. It is obvious to anyone with ordinary skills in the art that the above disclosures naturally extends to application comprised of any number processes with any hierarchy. When all processes have been created and initialized, the resources identified within the AVS are remapped 298 to ensure that the image is correctly mapped on the new host OS. Finally, with the entire state recreated, the application is released 299 from the barrier and resumes running from the place of the checkpoint.

The restoration of individual process checkpoints are now disclosed in further detail. FIG. 8 illustrates by way of example embodiment, 240 the structure of the checkpoint. Specifically, the layout of the checkpoint for an individual processes is given in blocks 260-272. During a restoration of a checkpoint, each page in the checkpoint is read and the data written to the appropriate memory page. By way of example the data 264 from the first page in the checkpoint 262 is written to the corresponding page in application memory. The same applies for all other pages within the address space of the application. Finally, after all processes have been recreated and restored, the resource information in the AVS is remapped against the new image and the application is ready to run.

8. Deployment Scenarios

FIG. 10 illustrates by way of example embodiment 300 a variety of ways the invention can be configured to operate.

In one embodiment, the invention is configured with a central file server 302, primary server 304 and backup server 306. The primary server 304 runs the primary application and the backup serves as backup. The primary 304 and backup 306 are connected to each other and the storage device 302 via a network 308. The network is connected to the internet 316 for external access. In another embodiment the primary server 304 has two backup servers; backup 306 and backup-2 305. In yet another embodiment the primary 304 runs in the data center, while the backup 317 runs off site, accessed over the internet In one embodiment a PC client 312 on the local network 308 is connected to the primary application while the backup application is prepared to take over in the event of a fault. In another embodiment a PC 314 is configured to access the primary application server 304 over the public internet 316. In a third embodiment a cell phone or PDA 310 is accessing the primary application 304 over wireless internet 316, 318. The present invention is configured to server all clients simultaneously independently of how they connect into the application server; and in all cases the backup server is prepared to take over in the event of a fault Finally, as the interceptors and kernel module are components implemented outside the application, the operating system and system libraries, the present invention provides checkpointing without requiring any modifications to the application, operating system and system libraries.

The just illustrated example embodiments should not be construed as limiting the scope of the invention but as merely providing illustrations of some of the exemplary embodiments of this invention

9. Conclusion

In the embodiments described herein, an example programming environment, systems and configurations were disclosed for which one or more embodiments according to the invention were taught. It should be appreciated that the present invention can be implemented by one of ordinary skill in the art using different program organizations and structures, different data structures, different configurations, different systems, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35

U.S.C. 112, sixth paragraph, unless the element is expressly recited using the phrase "means for."

What is claimed is:
1. A system, comprising:
computer system memory comprising one or more memory locations configured to store one or more multi-process applications;
one or more Central Processing Units (CPUs) operatively connected to said computer system memory and configured to execute said one or more multi-process applications on a host with a host operating system;
a checkpointer comprising a user-space checkpointer and a kernel-space checkpointer, and configured to generate checkpoints of said one or more multi-process applications; and
computer system memory and computer system storage configured to store said checkpoints;
wherein said user-space checkpointer is comprised of one or more user-space interceptors preloaded into an address space of each application process, wherein said user-space interceptors comprise at least one of a barrier, creation of a per-process checkpointing thread, and an application virtualization space providing a private resource name space;
wherein said kernel-space checkpointer is called while the execution of application processes are halted at said user-space barrier
wherein said kernel-space checkpointer is implemented as a character device;
wherein a read function of said character device skips memory pages not used by said application process;
wherein the read function of said character device includes memory pages used by said application process;
wherein said character device moves a device pointer forward to a next page after a read operation; and
wherein the character device read function calls are optimized by a skip of one or more of reserved low memory, reserved high memory, or memory reserved for the operating system.

2. The system according to claim 1 wherein said host operating system is one of Windows, Linux, Solaris or UNIX.

3. The system according to claim 1 wherein said kernel-space checkpointer is implemented as one of a kernel module, a loadable kernel module, kernel loadable module, a device driver or compiled into a kernel.

4. The system according to claim 1, further comprising storing said checkpoints in one or more of memory, local storage, remote storage, or networked storage.

5. The system according to claim 1, wherein a checkpoint is comprised of one or more of global system state, application process hierarchy, shared application process state, and state of application processes.

6. The system according to claim 5, wherein a checkpoint for an application process is comprised of one or more of total page count, and one or more of application memory pages.

7. The system according to claim 5, wherein said one or more of global system state, application process hierarchy, shared application process state, and state of application processes are written to memory, local storage, remote storage or networked storage as part of checkpointing said applications.

8. The system according to claim 7, wherein the process hierarchy is encoded as a tree.

9. The system according to claim 1, wherein checkpointing is triggered by one or more of elapsed time, CPU threshold, network threshold, storage threshold, configuration changes, external scripts, external programs, or by administrator.

10. The system according to claim 1, wherein a checkpoint trigger activates the barrier, and execution of application processes are halted at said barrier.

11. The system according to claim 1, wherein a page of application memory is checkpointed by reading said page with said character device.

12. A system, comprising:
computer system memory comprising one or more memory locations configured to store one or more multi-process applications;
one or more Central Processing Units (CPUs) operatively connected to said computer system memory and configured to execute said one or more multi-process applications on a host with a host operating system;
a checkpointer comprising a user-space checkpointer and a kernel-space checkpointer, and configured to generate checkpoints of said one or more multi-process applications;
wherein said user-space checkpointer is comprised of one or more user-space interceptors preloaded into an address space of each application process, wherein said user-space interceptors comprise at least one of a barrier, creation of a per-process checkpointing thread, and an application virtualization space providing a private resource name space;
wherein said kernel-space checkpointer implemented as a character device, and said kernel-space checkpointer is called while the execution of application processes are halted at said user-space barrier;
wherein checkpointing is comprised of first halting said application processes at said barrier, calling a read function of said character device for each memory page in each process in said applications on the checkpointing thread of said each application process, and storing said each page in said each application process' checkpoint;
wherein the read function of said character device skips memory pages not used by said application process;
wherein the read function of said character device includes memory pages used by said application process;
wherein said character device moves the device pointer forward to a next page after a read operation; and
wherein the character device read function calls are optimized by one or more of skipping reserved low memory, skipping reserved high memory, or skipping memory reserved for the operating system.

13. The system according to claim 12, wherein the read function of said character device is accessed through a virtual file system (VFS).

14. A non-transitory computer readable medium including a computer program having instructions, that when executed by a processor, cause the processor to perform operations including:
executing one or more multi-process applications on a host with a host operating system; and
executing a checkpointer comprised of a user-space checkpointer and a kernel-space checkpointer, and configured to generate checkpoints of said one or more multi-process applications;
wherein said user-space checkpointer is comprised of one or more user-space interceptors preloaded into an address space of each application process, wherein said user-space interceptors comprise at least one of a barrier, creation of a per-process checkpointing thread, and an application virtualization space providing a private resource name space;

wherein said kernel-space checkpointer is called while the execution of application processes are halted at said user-space barrier;
wherein aid kernel-space checkpointer is implemented as a character device;
wherein a read function of said character device skips memory pages not used by said application process;
wherein the read function of said character device includes memory pages used by said application process;
wherein said character device moves a device pointer forward to a next page after a read operation; and
wherein the character device read function calls are optimized by a skip of one or more of reserved low memory, reserved high memory, or memory reserved for the operating system.

15. The non-transitory computer readable medium including a computer program according to claim 14, wherein the read function of said character device is accessed through a virtual file system (VFS).

16. A non-transitory computer readable medium including a computer program having instructions, that when executed by a processor, cause the processor to perform operations including:
  executing one or more multi-process applications on a host with a host operating system; and
  executing a checkpointer comprised of a user-space checkpointer and a kernel-space checkpointer, and configured to generate checkpoints of said one or more multi-process applications;
wherein said user-space checkpointer is comprised of one or more user-space interceptors preloaded into an address space of each application process, wherein said user-space interceptors comprise at least one of a barrier, creation of a per-process checkpointing thread, and an application virtualization space providing a private resource name space;
wherein said kernel-space checkpointer implemented as a character device, said kernel-space checkpointer is called while the execution of application processes are halted at said user-space barrier;
wherein checkpointing is comprised of first halting said application processes at said barrier, calling a read function of said character device for each memory page in each process in said applications on the checkpointing thread of said each application process, and storing said each page in said each application process' checkpoint;
wherein the read function of said character device skips memory pages not used by said application process;
wherein the read function of said character device includes memory pages used by said application process;
wherein said character device moves a device pointer forward to a next page after a read operation; and
wherein the character device read function calls are optimized by a skip of one or more of reserved low memory, reserved high memory, or memory reserved for the operating system.

\* \* \* \* \*